United States Patent [19]

Nguyen

[11] Patent Number: 5,025,455
[45] Date of Patent: Jun. 18, 1991

[54] PHASE AMBIGUITY RESOLUTION FOR OFFSET QPSK MODULATION SYSTEMS

[75] Inventor: Tien M. Nguyen, Fullerton, Calif.

[73] Assignee: The United States of America as represented by the Administer, National Aeronautics and Space Administration, Washington, D.C.; The United States of America as represented by the Administrator of the National Aeronautics and Space Administration

[21] Appl. No.: 443,539

[22] Filed: Nov. 30, 1989

[51] Int. Cl.$^5$ .......................................... H04L 27/18
[52] U.S. Cl. ..................................... 375/53; 375/86; 329/304
[58] Field of Search ............... 375/39.54, 85, 86, 120, 375/53, 81; 329/304, 308, 310, 309, 306, 307

[56] References Cited

U.S. PATENT DOCUMENTS

| | | | |
|---|---|---|---|
| 3,736,507 | 5/1973 | Wolejsza, Jr. et al. | 325/30 |
| 3,806,815 | 4/1974 | Fletcher et al. | 375/86 |
| 4,092,606 | 5/1978 | Ryan | 329/308 |
| 4,313,205 | 1/1982 | Rhodes | 375/85 |
| 4,314,206 | 2/1982 | Attwood et al. | 375/86 |
| 4,344,178 | 8/1982 | Waters | 375/81 |
| 4,648,100 | 3/1987 | Mardirosian | 375/39 |
| 4,680,775 | 7/1987 | Exarque et al. | 375/39 |

OTHER PUBLICATIONS

Simon, M. K. et al., "Alias Lock Behavior of Sampled-Data Costas Loop," IEEE Transactions on Communications, vol. COM-28, No. 8, Aug. 1980.

Tsuji, Y. "Phase Ambiguity Resolution in a 4-Phase PSK Modulation System with Forward-Error-Correcting Convolutional Codes," Comsat Technical Review, vol. 6, No. 2, Fall 1976.

McGuffin, B. F. et al., "I/Q Channel Reversal Correcting Properties of an SQPSK Costas Loop with Integrated Symbol Synchronization," IEEE Trans. on Comm., vol. 36, No. 9, Sep. 1988.

Cacciamani, E. R. et al., "Phase-Ambiguity Resolutiomn in a Four-Phase PSK Communications System," IEEE Trans on Comm. Technology, vol. COM-19, No. 6, Dec. 1971.

Primary Examiner—Stephen Chin
Attorney, Agent, or Firm—Thomas H. Jones; Harold W. Adams; John R. Manning

[57] ABSTRACT

A demodulator for OQPSK signals modulated with two unique words resolves eight possible cominbations of phase ambiguity which may product data error by first processing received $I_R$ and $Q_R$ data in an integrated carrier loop/symbol synchronizer using a digital Costas loop with matched filters for correcting four of eight possible phase lock errors, and then the remaining four using a phase ambiguity resolver which detects the unique words to not only reverse the received $I_R$ and $Q_R$ data channels, but to also invert (complement) the $I_R$ and/or $Q_R$ data, or to at least complement the $I_R$ and $Q_R$ data for systems using nontransparent codes that do not have rotation direction ambiguity.

4 Claims, 9 Drawing Sheets

| $I_u$ | $Q_u$ | $O_1$ |
|---|---|---|
| 0 | 0 | 0 |
| 0 | 1 | 0 |
| 1 | 0 | 0 |
| 1 | 1 | 1 |

FIG. 8a

| $-I_u$ | $-Q_u$ | $O_2$ |
|---|---|---|
| 0 | 0 | 0 |
| 0 | 1 | 0 |
| 1 | 0 | 0 |
| 1 | 1 | 1 |

FIG. 8b

| $I_u$ | $Q_{uD}$ | $O_3$ |
|---|---|---|
| 0 | 0 | 0 |
| 0 | 1 | 0 |
| 1 | 0 | 0 |
| 1 | 1 | 1 |

FIG. 8c

| $-I_u$ | $-Q_{uD}$ | $O_4$ |
|---|---|---|
| 0 | 0 | 0 |
| 0 | 1 | 0 |
| 1 | 0 | 0 |
| 1 | 1 | 1 |

FIG. 8d

| $O_3$ | $O_4$ | REVERSE $I_R$ & $Q_R$ |
|---|---|---|
| 0 | 0 | 0 |
| 0 | 1 | 1 |
| 1 | 0 | 1 |
| 1 | 1 | 1 |

FIG. 8e

PHASE AMBIGUITY RESOLUTION FOR OFFSET QPSK MODULATION SYSTEMS

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to an offset quaternary phase-shift-keyed (OQPSK) system, and more particularly to a system in which a different unique word is modulated in each inphase and quadrature channel (I and Q) during transmission of the preamble of a message, and in which a receiver utilizes the I an Q channel reversal correction property of an OQPSK Costas loop with integrated symbol synchronization in resolving phase ambiguity conditions of the received message data bits.

BACKGROUND ART

The inherent problem associated with coherent QPSK systems is that of phase ambiguity at the receiver. This is due to the inability of the carrier recovery circuit to distinguish the reference phase from the other phase (or phases) of the received carrier. For QPSK system, there are eight possibilities of errors caused by the recovered carrier being at the wrong phase and also caused by phase rotation direction ambiguity (i.e., caused by the phase of the two channels being reversed) in the transmission medium.

For uncoded systems, the phase ambiguity problem can be resolved by using the differential encoding-decoding technique. However, that technique causes the decoded output to contain highly correlated errors (double-error phenomenon) since errors almost always occur in pairs. An alternate method of resolving the phase ambiguity problem in the coherent QPSK systems is to make use of the sync markers already existing in the framed data transmission.

For coded systems, the resolution of phase ambiguity becomes more involved. For example, with the conventional differential coding method implemented inside a forward error correcting (FEC) encoder and decoder pair, a burst or double error can occur, and the use of sync markers can result in the reduction of transmission efficiency.

For general discussion, phase ambiguity resolution techniques may be classified into two categories: differential coding technique, and nondifferential coding technique. For an uncoded QPSK system, a nondifferential coding technique known is a "unique-word detection" technique. For a coded system, there are two known techniques, a "threshold decoder" and "unique-word detection" technique. The following outlines these techniques.

A. Uncoded QPSK Systems
 1. Differential Coding
 2. Unique Word Detection
B. Coded QPSK Systems
 1. Differential Coding
   a. Differential Inside Forward-Error-Correcting (FEC) with Encoder and Decoder Pair (codec)
   b. Differential Outside Forward-Error-Correcting (FEC) with Encoder and Decoder Pair (codec)
 2. Nondifferential Coding
   a. Threshold Decoder
   b. Unique Word Detection The differential coding technique for uncoded QPSK systems is well known and reported in literature. (W. J. Weber, "Differential Encoding for Multiple Amplitude and Phase Shift Keying Systems," IEEE Transactions on Communications, Vol. COM-26, No. 3, March 1978.) The differential encoder can be readily paired with a differential decoder at a receiver. The receiver resolves the phase ambiguities based on the difference between the detected symbol phases. Since the difference is independent of the locked-in phase, the four-phase ambiguity associated with each case (normal or reverse sense) disappears at the output of the decoder differential. This technique is very simple to implement and can be performed in the modem independently on any data acquisition equipments, but due to the "burst error" associated with this technique (one erroneously detected phase will cause two consecutive false symbols), the detection performance of the transmitted sync markers can be degraded seriously.

The unique-word detection technique was patented by C. J. Wolejsza and E. R. Cacciamani, "Phase-Ambiguity Resolution in a Four-Phase PSK Communications System," U.S. Pat. No. 3,736,507. It utilizes two unique words (sync words) separately modulated onto the two quadrature I and Q channels at the transmitter. Since there are eight possible combinations of two possible cases (as shown in the following table), each combination uniquely defines one phase ambiguity condition.

TABLE I

THE RELATIONSHIPS BETWEEN THE TRANSMITTED AND RECEIVED DATA

| Carrier Phase Error (Degree) | Received Data Without Phase Rotation Direction Ambiguity (Normal Sense) | | Received Data With Phase Rotation Direction Ambiguity (Reverse Sense) | |
|---|---|---|---|---|
| | $I_R$ | $Q_R$ | $I_R$ | $Q_R$ |
| 0 | $I_T$ | $Q_T$ | $Q_T$ | $I_T$ |
| 90 | $-Q_T$ | $I_T$ | $I_T$ | $-Q_T$ |
| 180 | $-I_T$ | $-Q_T$ | $-Q_T$ | $-I_T$ |
| 270 | $Q_T$ | $-I_T$ | $-I_T$ | $Q_T$ |

Note:
The negative sign indicates the complement of the data

Thus, each error appearing in the two data channels of the QPSK demodulator is uniquely defined by a particular phase error. The unique-word detection technique is used to correct the errors at the outputs of the channels by monitoring and detecting the true or compliment form of the two unique words. For example, if the two unique words detected are in their complement form, then the received data should be inverted (complemented).

It should be noted that this unique-word detection technique does not identify the phase error of the recovered coherent carrier which caused the errors, but corrects the errors caused by the phase errors without phase rotation at 90°, 180° and 270° phase error. The sync markers already existing in the framed data transmission can be used as the unique words for resolving the phase ambiguity. This unique-word detection technique also has the advantage of not excluding the use of forward-error-correcting (FEC) techniques. However, it is more complex than the differential encoding-decoding technique and requires a careful selection of a suitable pattern for the unique words in order to achieve a low probability of false detection. Another disadvantage is that it may increase the number of noninformation bits in the total data stream thereby increasing the bandwidth necessary to transmit a given amount of information.

As shown in the outline above, the differential coding technique for coded QPSK systems can be classified into two categories: (a) phase ambiguity resolution by differential coding inside forward-error-correcting (FEC) with encoder and decoder pair (codec); and (b) phase ambiguity resolution by differential coding outside FEC codec.

The scheme for differential coding inside an FEC codec has a serious degradation in the bit error rate due to the burst error. (G. G. Forney and E. K. Bower, "A High-Speed Sequential Decoder: Prototype Design and Test," IEEE Transactions on Communication Technology, Vol. COM-19, No. 5, October 1971.) This is because one erroneously detected phase will cause two consecutive false symbols (a burst error) even if the next phase is received correctly. This burst error can cause a bit error rate degradation of 3 dB.

The adverse effect of the "burst error" in differential coding inside the FEC codec can be eliminated by using the well known technique of interleaving symbols. (Y. Tsuji, "Phase Ambiguity Resolution in a 4-Phase PSK Modulation System with Forward-Error-Correcting Convolutional Codes," COMSAT Technical Review, Vol. 6, No. 2, Fall 1976.) This is because the even and odd symbols are encoded independently so that the effect of burst error is changed to random error in the data, thus avoiding degradation. However, it should be noted that without symbol interleaving, the use of the differential coding inside the FEC codec does not require synchronization time to eliminate the phase ambiguity for the error decoder. This technique can be used in either a burst signal mode or a continuous signal mode. With symbol interleaving, this differential coding inside an FEC codec does not degrade the capability of the FEC codec with simplified hardware.

When differential coding is used an FEC codec, the bit error rate degradation due to "burst error" can be avoided. This is because the error correcting decoder does not encounter the double-error phenomenon, and only the bit error rate of the error-correcting decoder is of concern. Note that this decoder output bit error rate is an improved bit error rate due to error correcting action. Doubling the decoder output error rate results in a smaller bit signal-to-noise ratio loss than doubling the input error rate because the curve of bit error rate versus bit signal-to-noise ratio is steeper for the decoder output.

It is important to note that phase ambiguity resolution by differential coding external to error-control coding is to be used together with the synchronizer circuit of the FEC decoder. However, the resolution performance depends on the synchronizer circuit of the FEC decoder. This technique is not suitable for application to burst mode operations due to the relatively long time necessary for resolving the phase ambiguity.

For systems using nontransparent codes that do not have phase rotation direction ambiguity, there is no need for differential encoding because the synchronizer itself can resolve the phase ambiguity. For systems that have both phase rotation direction ambiguity (reverse sense) and recovered carrier phase ambiguity (normal sense), differential coding is always required regardless of the type of codes used (transparent or nontransparent).

As noted in the outline above, there are two nondifferential coding techniques for phase ambiguity resolution, namely a threshold decoder technique and a unique-word detection technique. The threshold decoder technique makes up of a synchronizer circuit that is inserted between the output of the QPSK demodulator and the input of a threshold decoder of a type which can correct a predetermined number of bit errors in a coded stream. (A. S. Dohne and E. R. Cacciamani, "Phase Ambiguity Resolution System Using Convolutional Coding-Threshold Decoding," U.S. Pat. No. 3,806,647, Apr. 23, 1974.) This particular synchronizer performs both phase ambiguity resolution and node synchronization without using unique code words. This synchronizer includes a memory counter which has all possible combinations of errors caused by the phase ambiguity. This memory counter is controlled by correction pulses which are generated int he synchronizer by an error rate detector.

When the number of correction bits during a frame exceeds the number which would normally occur if the system were operating correctly without phase ambiguity and without incorrect node synchronization, the synchronizer assumes that there is a problem caused either by phase ambiguity or node synchronization. Each time this occurs, the error rate decoder generates correction pulses.

The correction pulses are used to advance the memory counter through its states. It will eventually reach the state which makes all needed corrections since all possible combinations of errors are stored in the memory counter. When all errors are corrected, there will no longer be errors in the bit stream applied to the threshold decoder, the search pulses will then no longer be generated, and the memory counter will remain in the state which provides all needed corrections.

The threshold decoder technique improves communications efficiency, i.e., requires less bandwidth to transmit a given amount of information. But since the synchronizer has to search for the correct state out of all possible combinations of errors caused either by the phase ambiguity or node synchronization, this technique may require a relatively long time for phase ambiguity resolution.

The unique-word detection technique has been described above in connection with an uncoded QPSK system and can be modified for use with a coded QPSK system. At the transmitter, the unique words are inserted in a message preamble after the data has been encoded, and at the receiver, the unique words are detected before the FEC decoder. This implementation will allow the system to correct the errors caused by the phase ambiguity as described in connection with an uncoded QPSK system.

In summary, one particularly well-known technique for resolving the phase ambiguity of QPSK systems utilizes two unique words that are separately modulated onto the quadrature channels at the transmitter. This technique proposes that errors associated with eight possible phase ambiguity conditions can be corrected by detecting the true or complement of two unique words that are separately modulated onto the two quadrature channels at the transmitter. Since there are eight possible phase ambiguity conditions, correction of all errors by this technique requires a rather complicated circuit to resolve the phase ambiguity. Another technique described by E. Cacciamani, et al., in IEEE Transactions on Communication Technology, Vol. COM-19, No. 6, December 1971, titled "Phase-Ambiguity Resolution in a Four-Phase PSK Communications System," proposed to resolve the eight possible phase ambiguity conditions for offset QPSK systems, herein referred to as OQPSK. However, that scheme requires that proper timing between the two unique words can be known precisely.

Although the problem of phase ambiguity can be resolved by the techniques mentioned above in QPSK modulation systems, when unique-word detection techniques are used, the demodulator and the unique-word detector in a OQPSK receiver needs to be designed to achieve better performance while minimizing the complexity of the receiver.

STATEMENT OF THE INVENTION

When an offset quaternary phase-shift-keyed (OQPSK) communications link is utilized, the phase ambiguity of the reference carrier must be resolved. At the transmitter, two different unique words are separately modulated onto the quadrature carriers. At the receiver, the recovered carrier may have one of four possible phases, 0°, 90°, 180° or 270°, referenced to the nominally correct phase. The IF portion of the receiver channel may cause a phase-sense reversal, i.e., a reversal in the direction of phase rotation for a specified bit pattern. Consequently, eight possible phase relationships (the so-called eight phase ambiguity conditions of which one is correct) must be resolved. Using the in-phase (I) and quadrature (Q) channel reversal correcting property of an OQPSK Costas loop with integrated symbol synchronization, the four phase ambiguity conditions associated with the 90° and 270° carrier phase error are resolved. Thus, only the four possible phase ambiguity conditions associated with the 0° and 180° carrier phase remain, one of which is correct, namely the condition of 0° carrier phase error without phase rotation direction ambiguity in the received data. These remaining errors can be corrected by monitoring and detecting the polarity of the two unique words. The correction of the unique word polarities results in the complete phase ambiguity resolution of the OQPSK system. Accordingly, it is an object of this invention to use OQPSK modulation with two different unique words, one unique word in each of two quadrature (I and Q) channels during transmission of a preamble, and at the receiver to use the I/Q channel reversal correcting property of a Costas loop with an integrated symbol synchronizer before a unique-word detector is used to enhance performance of a carrier recovery system.

This unique combination uses first a digital Costas loop with integrated symbol synchronizer and then the unique-word detection for resolving the remaining four of eight possible phase ambiguity conditions, one of which is, of course, correct. This unique combination improves the carrier tracking at low signal-to-noise ratio without the complexity of timing that is dependent on a parallel-to-serial conversion clock in the receiver for phase ambiguity resolution.

The eight possible phase ambiguity conditions result in three possible types of errors:
 (a) Type 1 error: $I_R = I_T$ inverted, or $I_R = Q_T$ inverted
 (b) Type 2 error: $Q_R = Q_T$ inverted, or $Q_R = I_T$ inverted
 (c) Type 3 error: $I_R$ and $Q_R$ channels are switched (reversed), e.g., $I_R = Q_T$ or $I_R = Q_T$ inverted, or $Q_R = I_T$ or $Q_R = I_T$ inverted.

The present invention will not identify the phase ambiguities of the recovered coherent carrier that caused the errors, but will nevertheless correct all of the phase ambiguity errors.

In the preferred embodiment, the OQPSK receiver is implemented by an integrated carrier loop and symbol synchronizer using a digital Costas loop with matched arm filters, and a unique-word detector. The use of a digital Costas loop allows the novel OQPSK communication techniques to be implemented in a digital processor where the loop gain and loop filter time constants may be programmable. The integrated carrier loop and symbol synchronizer is properly designed such that two of the Type 3 errors (I/Q channel reversal due to phase ambiguities) can be corrected in the carrier tracking loop. For OQPSK systems with phase rotation direction ambiguity, the use of this loop can correct two additional Type 1 and Type 2 errors. Hence, four phase ambiguities can be corrected by using this Costas carrier tracking loop having an integrated symbol synchronizer in OQPSK systems. The remaining four phase-ambiguity errors are corrected by using the unique-word detection technique. Since only four possible combinations of phase-ambiguity errors remain for correction by unique-word detection, the necessary corrections can be implemented with very simple Boolean logic circuitry.

The novel features that are considered characteristic of this invention are set forth with particularity in the appended claims. The invention will best be understood from the following description when read in connection with the accompanying drawings.

BRIEF DESCRIPTION OF THE DRAWINGS

FIGS. 8a through 8e are truth tables which explain the operation of the logic diagram of FIG. 7.

DETAILED DESCRIPTION OF THE INVENTION

The following presents a detailed description of a new OQPSK communication system and more particularly a new receiver for OQPSK modulated data having two different unique words separately modulated onto the quadrature carriers.

Figure 1A:
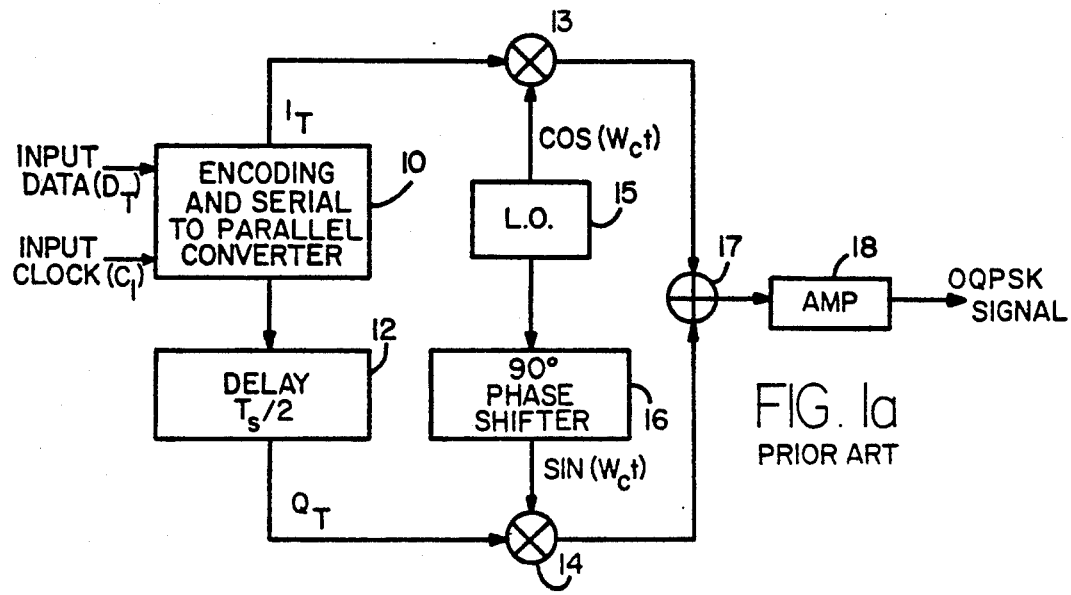
FIGS. 1a and 1b illustrate block diagrams of a prior-art OQPSK modulator and demodulator.
Figure 1B:
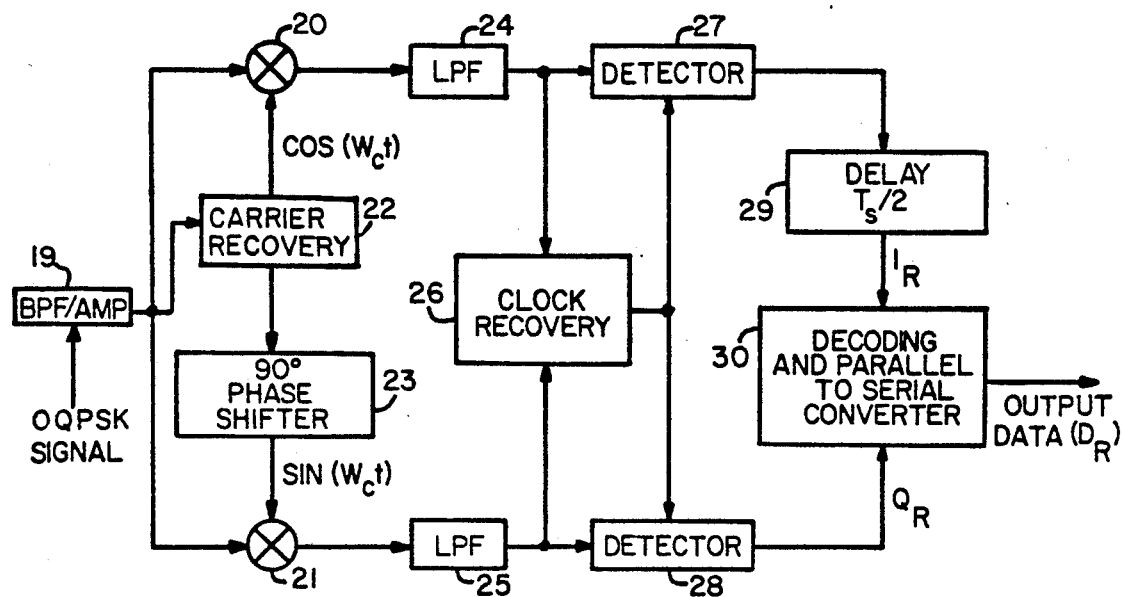
Figure 2:
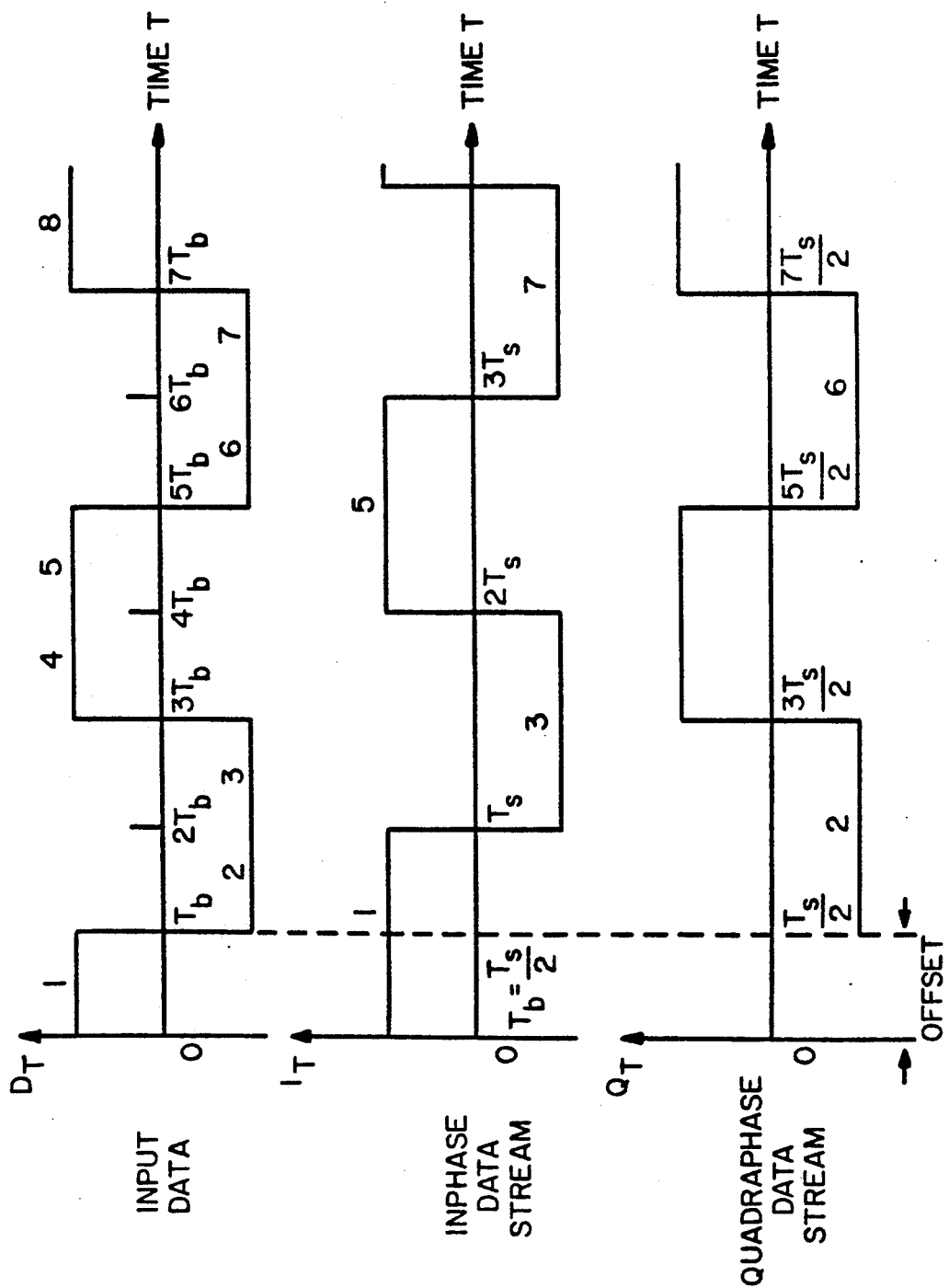
FIG. 2 illustrates a waveform diagram for the conversion of NRZ input data ($D_T$) into inphase data ($I_T$) and quadrature phase data ($Q_T$) by an offset quadrature pulse shift keying (QPSK) modulator.

Block diagrams of a conventional OQPSK modulator and demodulator are illustrated in FIGS. 1a and 1b, respectively. A nonreturn-to-zero (NRZ) data stream $D_T$ entering the modulator is converted by encoding and serial-to-parallel converter 1 into two separate data trains $I_T$ and $Q_T$ through an encoding and serial to parallel converter 10 for $I_T$, the inphase data stream, and through that converter 10 and a delay unit 12 for the quadrature-phase $Q_T$, with the symbol rate $R_s$ equal to half that of the incoming bit rate $R_b$. For the OQPSK modulation used in this invention, the $Q_T$ data stream is offset with respect to the $I_T$ data by delaying it by an amount equal to the incoming signal bit duration $T_b$. Thus, if $T_s$ is the symbol duration, then the delay is $T_s/2$, as shown in FIG. 2. The timing of the incoming data stream is controlled by the input clock $C_T$. The $I_T$ and $Q_T$ data streams are separately applied to multipliers 13 and 14, respectively. The second input to the multiplier 13 is the carrier signal $\cos(\omega_c t)$ from the local oscillator 15, and the second input to the multiplier 14 is the carrier signal shifted by exactly 90°, i.e., $\sin(\omega_c t)$, where $\omega_c$ equals $2\pi f_c$ and $f_c$ is the frequency of the local oscillator 15.

The output of each multiplier is a biphase PSK signal. The output of multiplier 13 has phase 0° or 180° relative to the carrier phase depending on whether $I_T=0$ or $I_T=1$ (also symbolized by $0=-I_T$ and $1=I_T$). The output carrier from multiplier 14 will have the phase of either 90° or 270° relative to the carrier phase depending on whether $Q_T=0$ or $Q_T=1$ (also symbolized by $0=-Q_T$ and $1=Q_T$). The output multipliers are then combined in a linear summing means 17 to yield an OQPSK signal. This signal is then amplified by an amplifier 18 and transmitted via any suitable transmission medium to a receiver. At the receiver, the demodulator shown in FIG. 1b performs the inverse operation of the modulator and generates the output data stream $D_R \approx D_T$.

For coherent OQPSK systems, a coherent carrier must be recovered from the received signal, and a coherent clock must be reconstructed from the demodulated data waveform. A conventional OQPSK demodulator is shown in FIG. 1b and includes a bandpass filter and amplifier 19, balanced demodulators 20 and 21, carrier recovery circuit 22, low-pass filters 24 and 25, clock recovery circuit 26, detectors 27 and 28 for recovery of $I_T$ and $Q_T$ bit streams, delay line 19 and decoder and parallel-to-serial converter 30.

The received data stream $D_R$ is not always equal to the transmitted data stream $D_T$ because of noise and phase ambiguities in the phase of the recovered carrier. If the carrier recovery circuit can lock on the reference phase of the received carrier, then $I_R \approx I_T$, $Q_R \approx Q_T$ and there will be no error, $D_R \approx D_T$. However, for the received data without phase rotation direction ambiguity, the received carrier has four possible phases relative to the reference carrier phase; the receiver can lock on any of the four phases. For received data with phase rotation direction ambiguity, there are four additional possible phases relative to the reference carrier, as noted above in the general discussion of the background art, and the receiver can lock on any of the eight phases associated with it.

As described in that earlier discussion of the prior art, these eight unique combinations uniquely define the phase ambiguities which are combinations of the three specific types of errors mentioned above, namely Type 1, Type 2, and Type 3. The classification of the phase ambiguities into three definable errors allows the concepts of (1) integrated carrier loop/symbol synchronization, and (2) unique-word detection to be combined in an OQPSK system for resolving the eight possible phase ambiguity conditions. As noted above in the Statement of the Invention, four conditions can be resolved by utilizing an integrated carrier loop/signal synchronizer implemented with a digital Costas loop having matched arm filters. The remaining four conditions are resolved by utilizing the unique-word detection technique.

Figure 3:
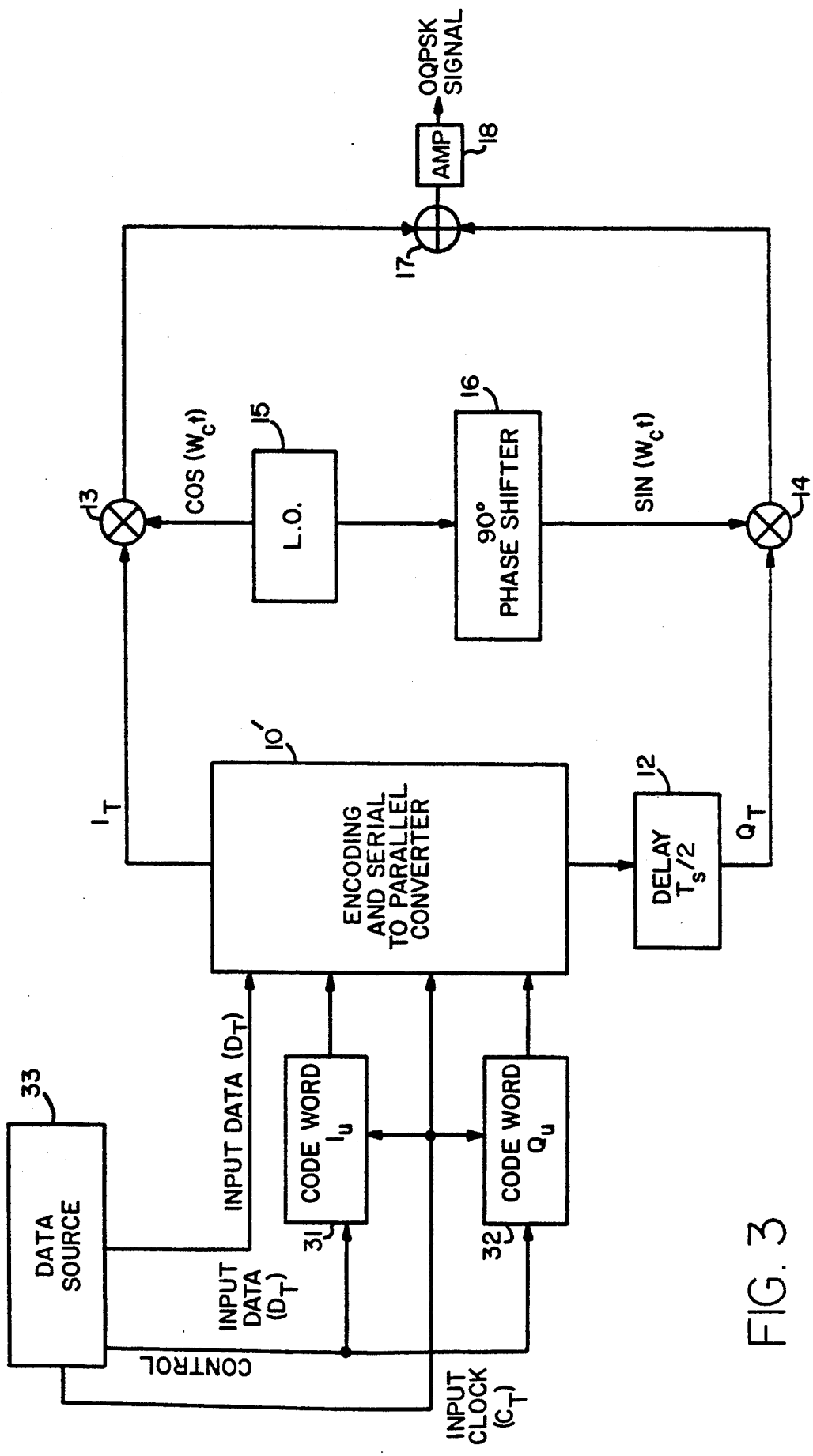
FIG. 3 illustrates a block diagram for an OQPSK modulator with unique-word modulation.
Figure 4:
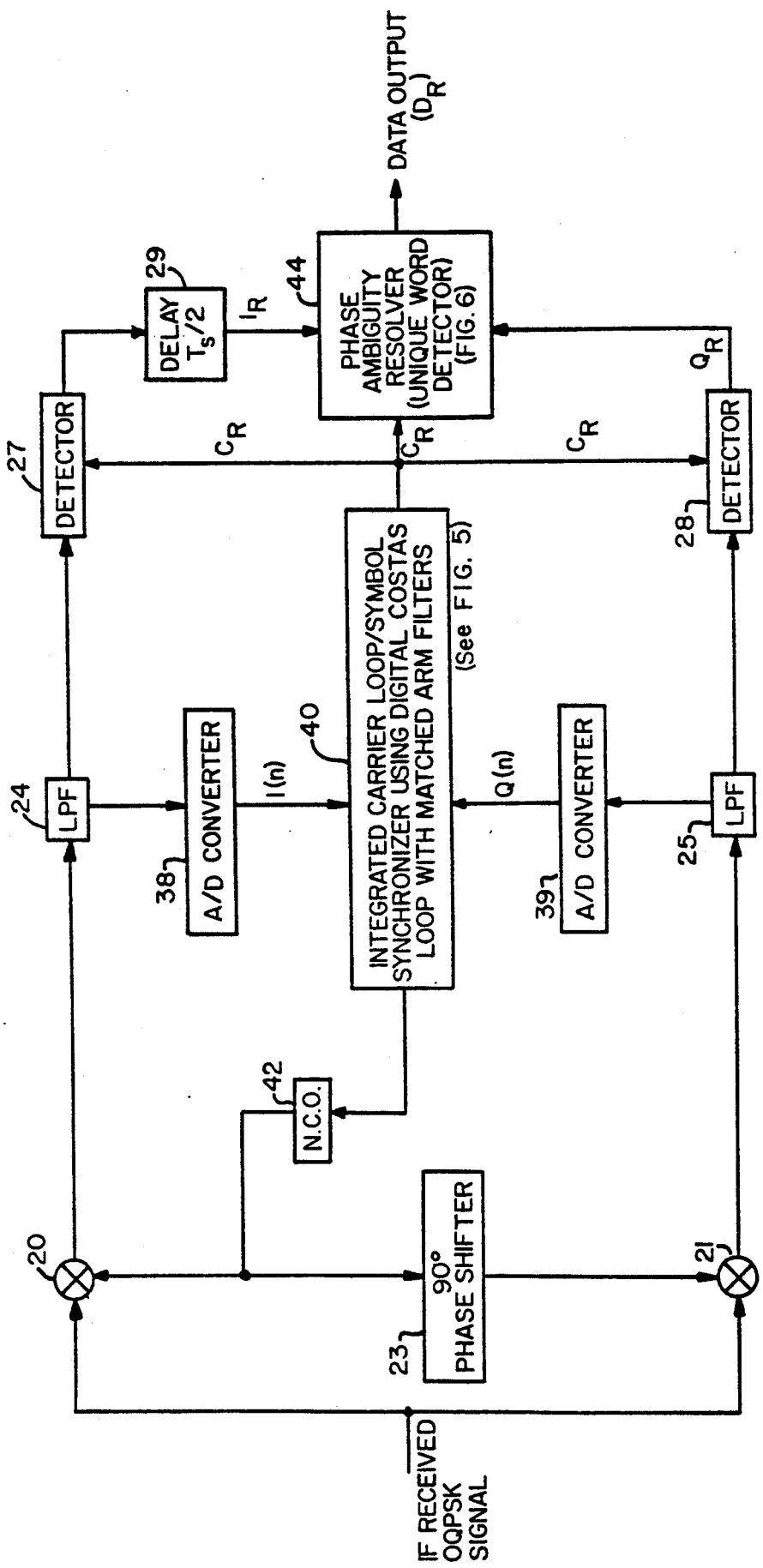
FIG. 4 illustrates a block diagram of an OQPSK demodulator with phase ambiguity correction using a digital Costas loop with an integrated symbol synchronizer and phase ambiguity resolution with a unique-word detector in accordance with the teachings of the present invention.

Generalized block diagrams of the OQPSK modulator and demodulator with phase-ambiguity correction in accordance with the teachings of the present invention are shown in FIGS. 3 and 4, respectively. As illustrated in FIG. 3, the block diagram for this modulator is very similar to the conventional OQPSK modulator shown in FIG. 1a. An important difference is the unique code-word generators 31, 32 for inserting the unique words $I_u$ and $Q_u$ into the quadrature bit streams $I_T$ and $Q_T$. The encoding and serial-to-parallel converter 10 of the modulator shown in FIG. 1a is modified (hence identified in this figure by the reference numeral 10') only to the extent of periodically inserting different code words $I_u$ and $Q_u$ in the data stream. A control signal at the data source 33 periodically interrupts the input data stream and enables the code words $I_u$ and $Q_u$ to be serially transmitted in parallel. In practice the code words blocks 31 and 32 would be implemented as part of the data source 33. The balance of the OQPSK modulator is the same as the prior-art OQPSK modulator shown in FIG. 1a and therefore identified by the same reference numerals. Although the unique-word detection technique for phase-ambiguity resolution in a QPSK communication system has been known, as noted in the above discussion of background art, its role in the present invention is unique, and so the block diagram of FIG. 3 is unique. Each of the unique words $I_u$ and $Q_u$ has length N, and is periodically clocked by an input clock $C_T$ into the data streams $I_T$ and $Q_T$, respectively. It should be noted that the unique code words can be used as the synchronization symbols.

Through recent developments in digital technology, digital implementation of the Costas loop is becoming increasingly more attractive. Advantages of the digital Costas loop include its relative insensitivity to temperature variations and aging, and the ability to program its loop parameters, such as loop gain and loop filter time constants. Utilizing this technology, an integrated carrier/symbol synchronization system based on a digital decision feedback is proposed for a carrier recovery loop. A block diagram for a new OQPSK demodulator is shown in FIG. 4 in which those blocks common to the prior-art demodulator of FIG. 1b are identified by the same reference numerals. New components added in this invention are: A/D converters 38, 39; integrated carrier loop/symbol synchronizer using digital Costas loop with matched arm filters 40; a numerically controlled oscillator (N.C.O.) 42; and a phase ambiguity resolver 44. The carrier recovery and clock recovery loops of the prior-art demodulator of FIG. 1a are replaced by the integrated carrier loop/symbol synchronizer 40.

In operation, the integrated carrier loop/symbol synchronizer 40 (using a digital Costas loop with matched arm filters) will be responsible for resolving four phase ambiguities, two due to received data without phase rotation direction ambiguity (normal sense) and two due to received data with phase rotation direction ambiguity (reverse sense). See Table I above. The phase-ambiguity resolver 44 will resolve the other four of eight possible phase ambiguities.

Figure 5:
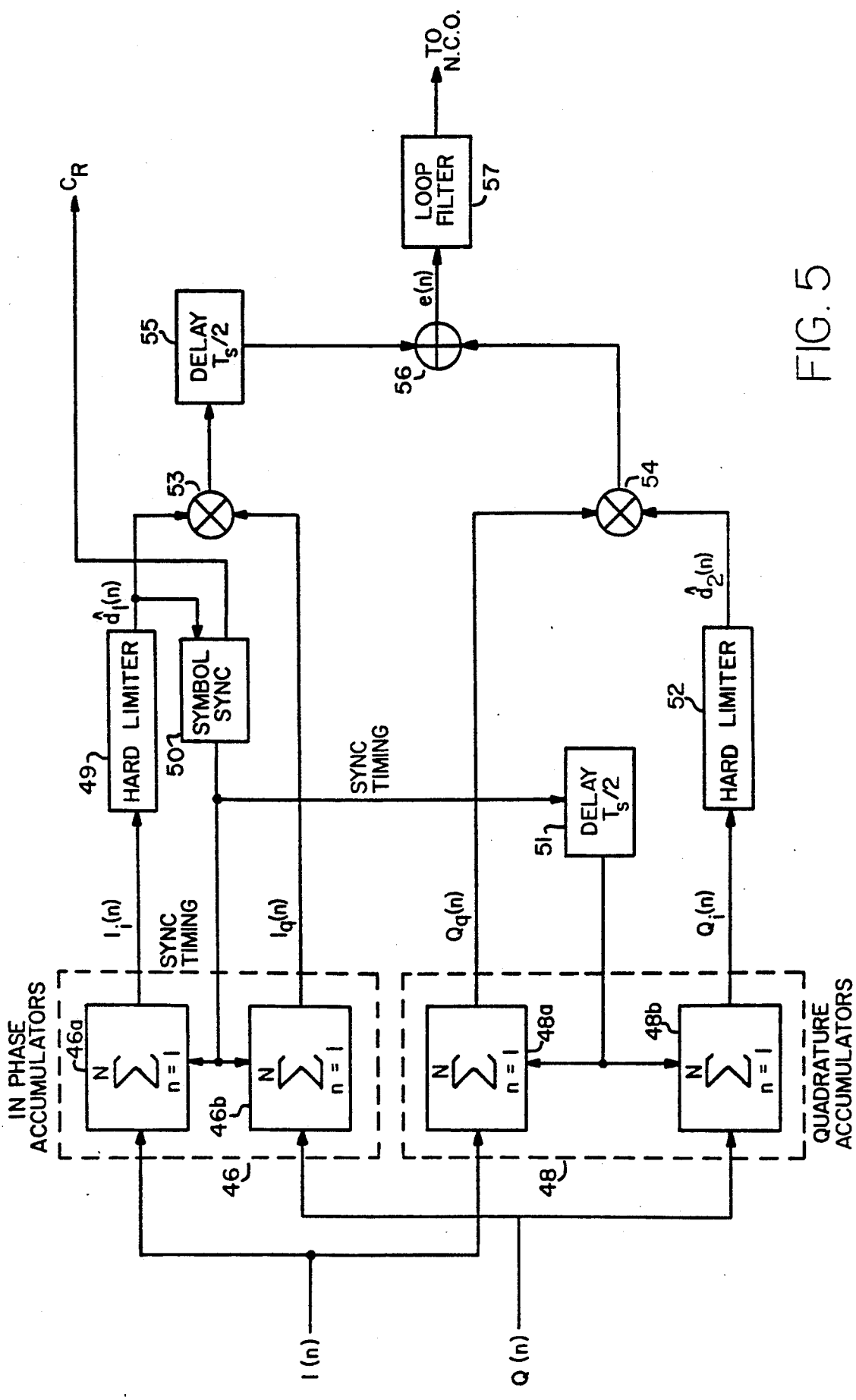
FIG. 5 is a block diagram of an integrated carrier loop/symbol synchronizer using a digital Costas loop with matched arm filters shown in the block diagram of FIG. 4.

A preferred implementation of the integrated carrier loop/symbol synchronizer is illustrated in FIG. 5. This figure shows details of the carrier recovery loop structure. It also shows how the carrier phase and symbol synchronization can be derived jointly. The illustrated carrier recovery loop comprises inphase and quadrature accumulators 46 and 48, quadrature delay units 51 and 55, symbol synchronizer 50, multipliers 53 and 54, linear adder 56 and loop filter 57.

The sampled baseband signals I(n) and Q(n) from the respective inphase and quadrature A/D converters 38 and 39 (FIG. 4) are routed to the respective inphase and quadrature accumulators 46 and 48, respectively. It should be noted here that the inphase accumulator 46 consists of accumulate-and-dump circuits 46a, 46b, and the quadrature accumulator 48 consists of accumulate-and-dump circuits 48a, 48b. The inphase accumulator 46 is synchronized with the inphase data stream by timing from the symbol synchronizer 50. The inphase accumulator 46 produces two signals, $I_i(n)$ and $I_q(n)$. The quadrature accumulator 48 synchronized by timing from the symbol synchronizer delayed by the unit 51 produces $Q_q(n)$ and $Q_i(n)$. Note that the symbol synchronizer also derives a data reference clock $C_R$.

The estimates of symbol polarity $d_1(n)$ and $d_2(n)$ for the inphase and quadrature channels, respectively, are produced by passing $I_i(n)$ and $Q_i(n)$ through the hard limiters 49 and 52, respectively. The inphase estimate of the symbol polarity from the hard limiter 49 is used as the feedback signal to control the timing output of the symbol synchronizer 50. Also, both $d_1(n)$ and $d_2(n)$ are separately applied to the inphase and quadrature multipliers 53 and 54, respectively.

The second input to the inphase multiplier 53 is the output of accumulate-and-dump circuit 46b, and the second input to the quadrature multiplier 54 is the output of accumulate-and-dump circuit 48a. The output of inphase multiplier 53 is delayed by the delay unit 55. The delayed output of the multiplier 53 and the output of the quadrature multiplier 54 are added by a linear adder 56 to produce a tracking error signal e(n). After filtering by the loop filter 57, the error signal is fed back to the numerical controlled oscillator (N.C.O.) 42 shown in FIG. 4, thus closing the phase-locked loop of the receiver.

It has been shown by Bruce F. McGriffin and Paulman Kwong, "I/Q Channel Reversal Correcting Properties of an SQPSK Costas Loop with Integrated Symbol Synchronization," IEEE Trans. on Commun., Vol. 36, pp. 1082-1086, September, 1988, that for a ratio of carrier loop bandwidth ($B_L$) to symbol synchronization loop bandwidth ($B_s$) much greater than one, i.e., $(B_L/B_s) >> 1$, the integrated carrier tracking loop of FIG. 5 can avoid the lock points at 90° to 270°, thereby achieving automatic I/Q channel reversal correction. Consequently, this carrier tracking loop can resolve two phase ambiguity conditions for received data without phase rotation ambiguity (Type 3 errors), and two additional phase ambiguity conditions for received data with phase rotation direction ambiguity. A ratio of $B_L/B_2 \geq 10$ has proved that the loop can avoid the lock points at 90° and 270° successfully. Since this carrier tracking loop can avoid 90° and 270° lock points, the relationships between the transmitted and received data for the system described in FIGS. 3 and 4 will be different from that shown in Table I. For this case, the effect of an incorrect recovered-carrier phase on the demodulated data is shown in Table II.

TABLE II

THE RELATIONSHIPS BETWEEN THE TRANSMITTED AND RECEIVED DATA (FOR OQPSK SYSTEM WITH AND WITHOUT PHASE ROTATION DIRECTION AMBIGUITY)

| Carrier Phase Error (Degree) | Received Data Without Phase Rotation Direction Ambiguity (Normal Sense) | | Received Data With Phase Rotation Direction Ambiguity (Reverse Sense) | |
|---|---|---|---|---|
| | $I_R$ | $Q_R$ | $I_R$ | $Q_R$ |
| 0 | $I_T$ | $Q_T$ | $Q_T$ | $I_T$ |
| 180 | $-I_T$ | $-Q_T$ | $-Q_T$ | $-I_T$ |

Translating the above Table II relationships into the effects they create on the demodulated data in the inphase and quadrature channels, it can be seen that there remain only three phase ambiguity conditions but cause errors, and that these three errors are the three unique combinations of the three types of errors mentioned previously. The three definable errors are: (1) $I_R = -I_T$ and $Q_R = -Q_T$ from the first column of Table I, i.e., received data without phase rotation ambiguity, or (2) $I_R = Q_T$, and $Q_R = I_T$, and (3) $I_R = -Q_T$, and $Q_R = -I_T$ from the second column of Table I, i.e., received data with phase rotation ambiguity. Only $I_R = I_T$ and $Q_R = Q_T$ are correct.

A complete resolution of the phase ambiguity is accomplished by detecting the presence of individual phase ambiguity conditions and correcting the resulting three errors in the phase-ambiguity resolver 44 (FIG. 4) using the unique word detection technique, i.e., by monitoring and detecting the unique words $I_u$ and $Q_u$ in the quadrature channels. If $-I_u$ and $-Q_u$ are detected in the I and Q channels, respectively, thus indicating that the data in these channels are inverted without phase rotation, the error can be corrected directly by inverting the channel outputs prior to serializing the two-bit-parallel data into serial $D_R$. Similarly, if $-Q_u$ and $-I_u$ are detected in the I and Q channels, respectively, thus indicating that the data in these channels are inverted with phase rotation, the data in these channels may be corrected by both inverting and reversing the data channels.

The block diagram of the phase-ambiguity resolver 44 in FIG. 6 will now be described. The phase-ambiguity resolver 44 comprises: inverters 58, 59 60; gating means 61, 62, 63; parallel-to-serial converter 64b; flip-flop circuits 65, 66, 72; cross-coupling gate 67; $I_u$ correlator 69; $Q_u$ correlator 70; shift register 71; and decoding matrix 68.

In normal operation, the received $I_R$ and $Q_R$ data streams are fed uninverted through gates 61 and 62, respectively, to be combined by a parallel-to-serial converter 64 into a serial output data stream $D_R$ in which an $I_R$ bit precedes the $Q_R$ bit. The interlacing of $I_R$ and $Q_R$ bits to the shift register 70 in that order is controlled by a clock $C_R$ recovered from the received data signal. Each of the gates 61 and 62 is adapted to pass the data either directly or after inversion by respective inverters 58 and 59, to the parallel-to-serial converter. Control of gates 61 and 62 is accomplished via the outputs of flip-flops 65 and 66, respectively. The output data stream $D_R$ is also applied to the shift register 71 which has 2N stages, where N is the length of each unique code word. If the data bits are received without phase error, the shift register 71 enters the bits in the order shown starting with $I_{r1}$ and concluding with $Q_{rn}$.

Note that each squarewave clock pulse $C_R$ enters a data bit $I_{r1}$ at the leading edge and a data bit $Q_{ri}$ at the trailing edge so that for N clock pulses $C_{ri}$ through $C_{rn}$ there will be stored 2N interlaced data bits as shown.

If the unique words $I_r$ and $Q_r$ entered in the respective correlators 69 and 70 correlate with the $I_u$ and $Q_u$ bits stored, $I_u$ and $Q_u$ signals are transmitted to the decoding matrix. If the unique words $I_r$ and $Q_r$ entered in the shift register correspond only with the compliments of $I_u$ and $Q_u$ bits stored in the correlators 69 and 70 $-I_u$ and $-Q_u$ signals are transmitted to the decoding matrix. This correlation function is readily implemented in each correlator with N logic gates which compare $I_r$ with $I_u$ and N logic gates that compare $I_r$ with $-I_u$ and similarly two sets of N logic gates that compare $Q_r$ with $Q_u$ and with $-Q_u$. Correlators so implemented would not tolerate a single dropped bit error. Therefore to design some tolerance into the correlators, the outputs of each set of N logic gates may be effectively summed and at any time $t_i$ that the sum is equal to N−1 or N−2 depending on the degree of tolerance, for example, the corresponding correlator output signal is generated. All of this occurs automatically each time a preamble that precedes a block of data is received since the unique code words are inserted into each preamble.

Consider the first two possible phase ambiguity conditions of Table II for which $I_R = I_T$, $Q_R = Q_T$ and $I_R = -I_T$, $Q_R = -Q_T$. For these two conditions, the order of the bits in the output data stream $D_R$ is correct, i.e., $I_{ri}$ precedes $Q_{ri}$ by one bit, $I_{r(i+1)}$ precedes $Q_{r(i+1)}$ by one bit, and so on. The only error occurs when both of the data streams are inverted. Let time $t = t_0$ be defined as the time when the shift register 71 is fully loaded with two unique received words $I_u$ and $Q_u$ interlaced as shown in FIG. 6. Because the stages of correlators 69 and 70 are connected to every other stage of shift register 71, at time $t_0$ only the $Q_u$ correlator 70 is looking at its corresponding unique word prestored in the correlator 70. The $Q_u$ correlator will provide either a logic output $Q_u$ on the plus (+) output line or $-Q_u$ on the minus (−) output line. At one bit time earlier $t = t_{0-1}$, the $I_u$ correlator 69 will similarly detect the $I_u$ unique word in the shift register and produce either a logic output $I_u$ on the plus (+) output line or $-I_u$ on the negative (−) output line. If the correlators 69 and 70 detect $I_u$ and $Q_u$, respectively, no action is taken. If both $I_R = -I_T$ and $Q_R = -Q_T$, the correlators 69 and 70 will detect $-I_u$ and $-Q_u$, respectively, and send the representative logic signals through cross-coupling gate 67 and toggle T-type flip-flop circuits 65 and 66. The changes in outputs from flip-flop circuits 65 and 66 will reverse the state of the select gates 61 and 62 and pass the data streams $-I_R$ and $-Q_R$, respectively, to parallel-to-serial converter 64.

Consider the third possible phase ambiguity condition in Table II for which $I_R = Q_T$, and $Q_R = I_T$. For this condition, order of the bits in the output data stream $D_R$ is not correct; $Q_{ri}$ precedes $I_{ri}$ by one bit time, etc. In this case, the correlators 69 and 70 will first detect $Q_u$ followed one bit later by $I_u$. The decoding matrix will generate a "reverse $I_R$ & $Q_R$" control signal to toggle T-type flip-flop 72, causing a state reversal of the select gate 63 and pass the inverted recovered-clock pulses to the parallel-to-serial converter 64 to cause a reversal of the data channels at the serial output of the converter 64.

Consider the fourth possible ambiguity condition in Table II for which $I_R = -Q_T$, and $Q_R = -I_T$. In this case, the data channels are both inverted and reversed. Again the correlators 69 and 70 will detect $-Q_u$, followed one bit later $-I_u$, and send the representative logic signals through cross-coupling gate 67 to toggle flip-flop circuits 65 and 66. At the same time, the decoding matrix will also generate a "reverse $I_R$ & $Q_R$" control signal to toggle flip-flop 72, causing a reversal of the data channels at the output of converter 64. The in phase and quadrature data channels must not only be reversed but must also be inverted to be correct. Since $I_R$ and $Q_R$ are passing through gates 62 and 61, respectively, to the converter 64 rather than gates 61 and 62, respectively, the "invert $I_R$" signal must toggle flip-flop 66 rather than 65, and the "invert $Q_R$" control signal must toggle flip-flop 65 rather than 66. This is taken care of by the cross-coupling gate 67. The switching of the flip-flop 72 causes a reversal in the connections between the two input terminals and the two output terminals of the cross-coupling gate 67 while at the same time switching the select gate 63 to reverse the order of $Q_T$ and $I_T$ within the converter 64 out to the shift register 71.

Figure 6:
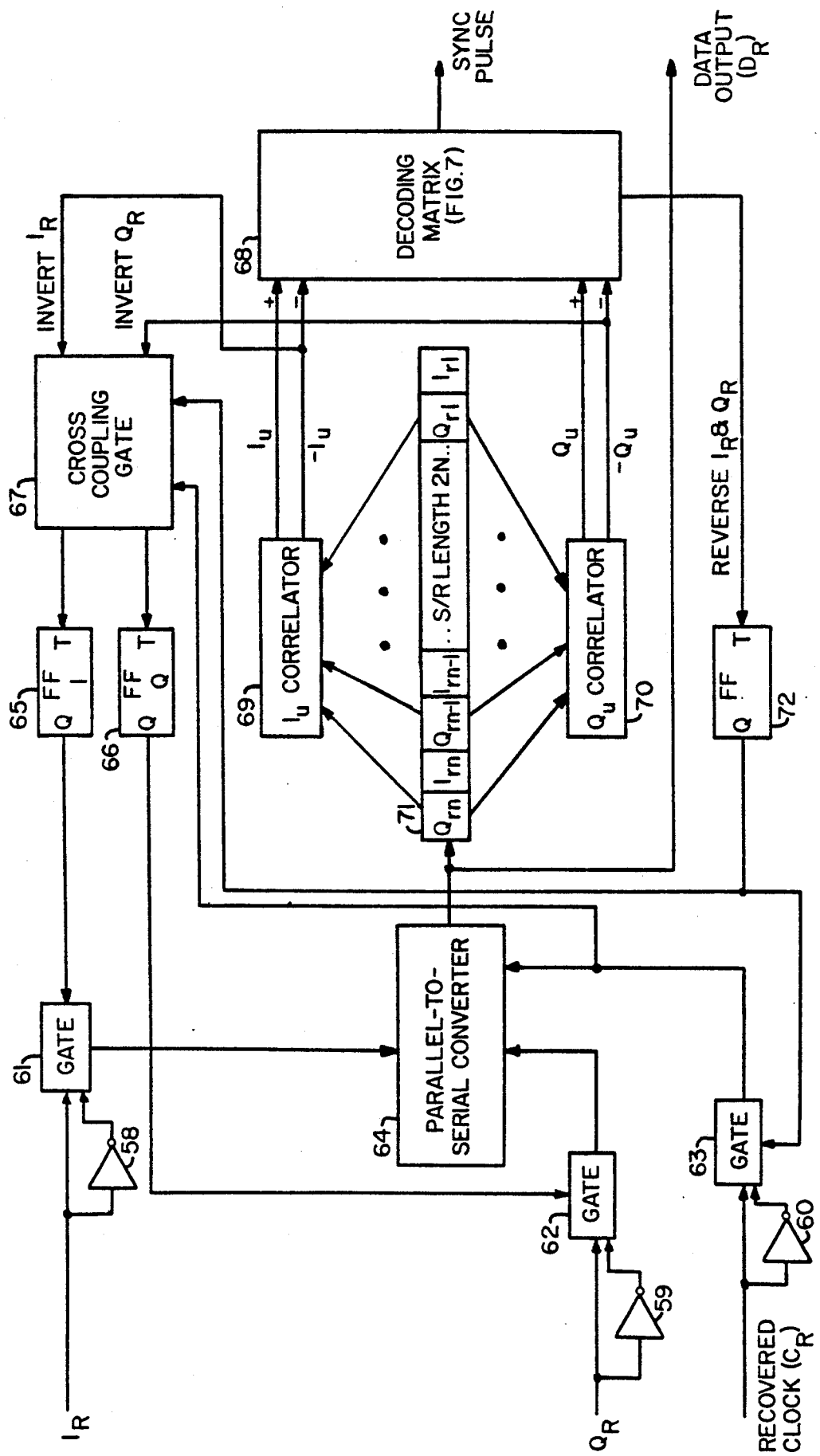
FIG. 6 is a block diagram of the phase ambiguity resolver for an OQPSK demodulator shown in FIG. 4 with phase rotation direction ambiguity.
Figure 7:
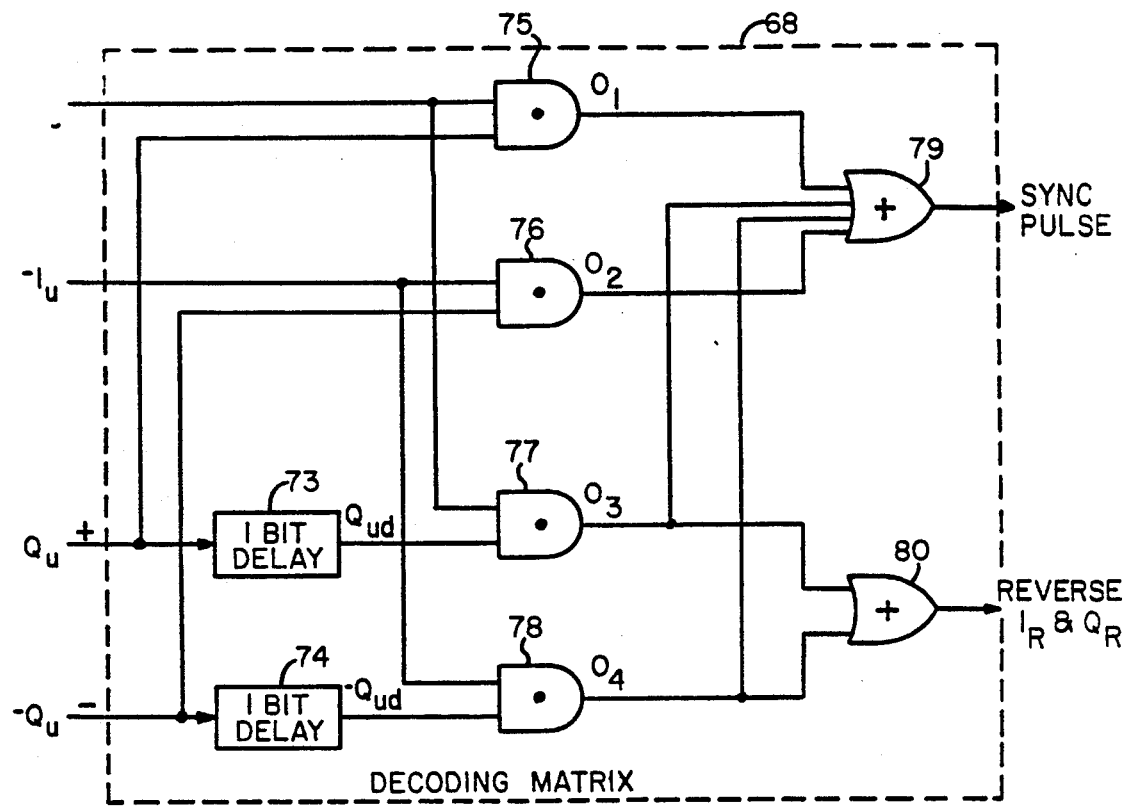
FIG. 7 is a logic diagram of a decoding matrix which forms a part of the phase ambiguity resolver shown in FIG. 6.

The block diagram of the decoding matrix 68 shown in FIG. 7 is responsible for providing (1) sync pulses for data synchronization purposes in blocks 64, 67, 69, 70 and 71 of FIG. 6; and (2) a "reverse $I_R$ & $Q_R$" control signal. The sync pulses may also be used for synchronization of data processing equipment utilizing the data output, $D_R$. The decoding matrix 68 is comprised of one-bit-delay units 73 and 74, AND gates 75, 76, 77 and 78, and OR gates 79 and 80. Operation of the decoding matrix 68 is defined by the truth tables shown in FIGS. 8a through 8e for the respective AND gates 75 through 78. In order to insure a proper lock in the input-output connections of the cross-coupling gate 67 (FIG. 6), a one bit delay is provided at the input of each AND gate 77 and 78 that are coupled to cross-coupling gate 67 by the OR gate 80. From FIGS. 8a through 8d it may be seen that any condition of $I_u \cdot Q_u$; $-I_u \cdot -Q_u$; $I_u \cdot Q_{uDelayed}$ and $-I_u \cdot -Q_{uDelayed}$ will produce a sync pulse, but if phase rotation direction ambiguity is required for the condition $I_u \cdot Q_{uDelayed}$ or $-I_u \cdot -I_{uDelayed}$, or both of those two conditions, the output of OR gate 80 will be true to deliver a "reverse $I_R$ & $Q_R$" control signal.

Figure 9:
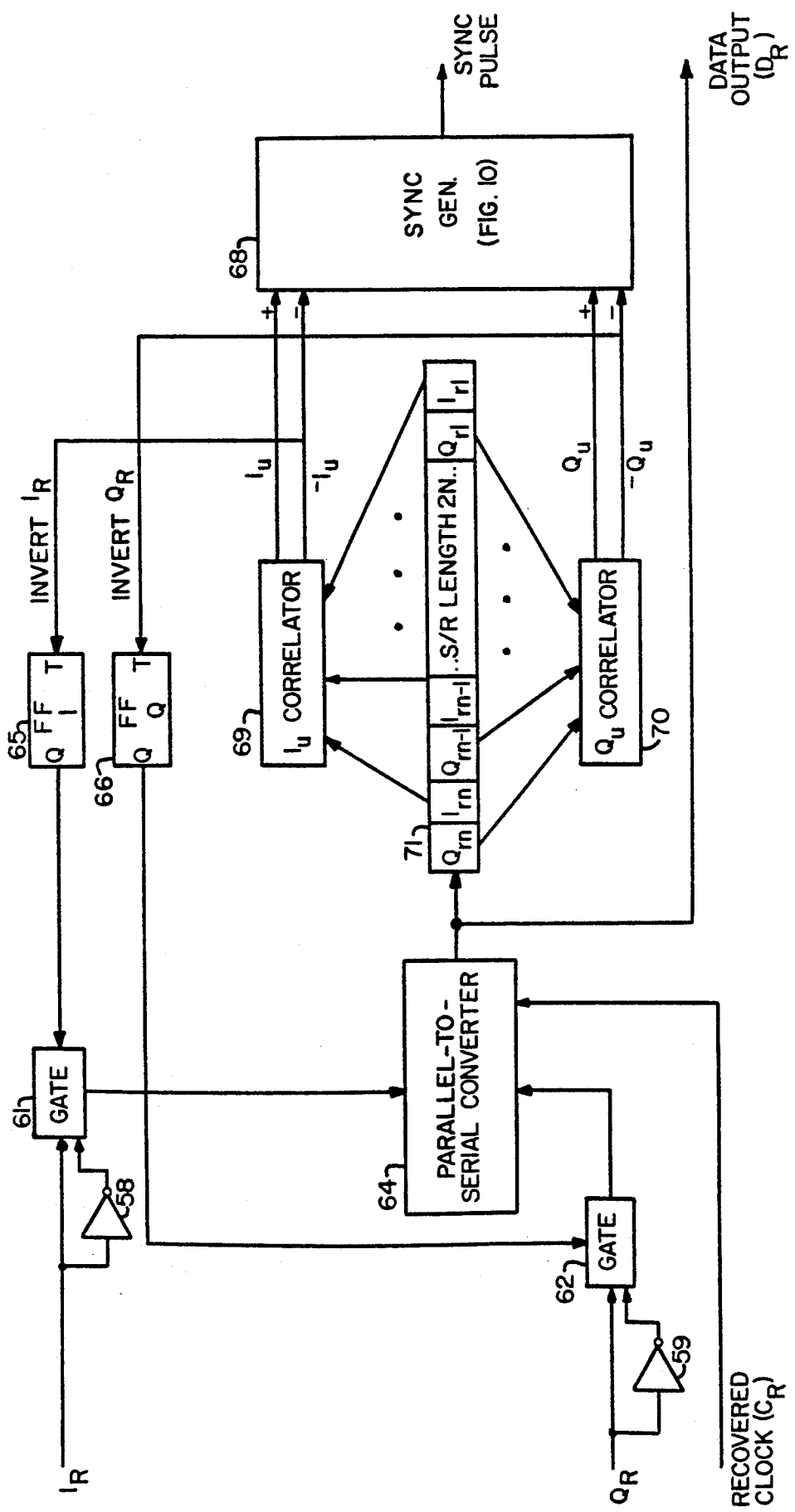
FIG. 9 is a block diagram of the phase ambiguity resolver for an OQPSK demodulator shown in FIG. 4 without phase rotation direction ambiguity.

If the relationship between the transmitter local frequency and the receiver local frequency is predetermined for the phase rotation direction ambiguity shown in the first column of Table II above, phase rotation direction ambiguity can be avoided, and the phase-ambiguity correction system can be redesigned. FIG. 9 shows a block diagram of a redesigned system.

The redesigned system is illustrated in FIG. 9 with the same reference numerals as in FIG. 6 because, as will become more apparent from the following description, the difference is the omission of the cross-coupling gate 67, inverter 60, gate 63 and flip flop 72. The omitted elements are involved in inverting $I_R$ and $Q_R$, and in reversing $I_R$ and $Q_R$, neither of which is required for resolving phase ambiguity when the phase relationship between the transmit local frequency and the received local frequency is known and constant.

In normal operation, the $I_R$ and $Q_R$ data streams are fed through gates 61 and 62, respectively, to combine the data by parallel-to-serial converter 64, and produce an output data stream $D_R$ in which the $I_R$ bit precedes the $Q_R$ bit. Each of the gates 61 and 62 is adapted to pass the data directly or after inversion by inverters 58 and 59 to the parallel-to-serial converter 64. Control of gates 61 and 62 is accomplished via the outputs of the flip-flop circuits 65 and 66, respectively. The output data stream $D_R$ is also applied to the shift register 71 which has 2N stages, where N is the length of the unique codeword.

Consider the only error shown in Table II to be $I_R = -I_T$ and $Q_R = -Q_T$. For this combination, the order of the bits in the output data stream $D_R$ is correct, i.e., $I_{ri}$ precedes $Q_{ri}$ by one bit, and so on. The error occurs only when both of the data streams are inverted. Let time, $t = t_0$ be defined as the time when the shift register 71 is fully loaded with two unique words, $I_u$ and $Q_u$, interlaced as shown in FIG. 9. Because the stages of correlators 69 and 70 are connected to every other stage of shift register 71, at time $t_0$ only the correlator 70 is detecting at its output terminals the corresponding unique word $Q_u$. The correlator 70 will provide either a logic output $Q_u$ on the plug (+) output line or $-Q_u$ on the minus (−) output line.

At time $t = t_{0-1}$ (one bit earlier), the correlator 69 will detect the $I_u$ unique word and produce either a logic output $I_u$ on the plus (+) output line or $-I_u$ on the negative (−) output line. If the correlators 69 and 70 detect $I_u$ and $Q_u$, respectively, no action is taken. If $I_R = -I_T$, and $Q_R$ and $-Q_T$, the correlators 69 and 70 will detect $-I_u$ and $-Q_u$, respectively, and send the representative logic signals to toggle flip-flops 65 and 66. The changes in outputs from flip-flops 65 and 66 will reverse the state of the gates 61 and 62 and pass the data streams $-I_R$ and $-Q_R$, respectively, to parallel-to-serial converter 64 from the inverters 58 and 59.

Figure 10:
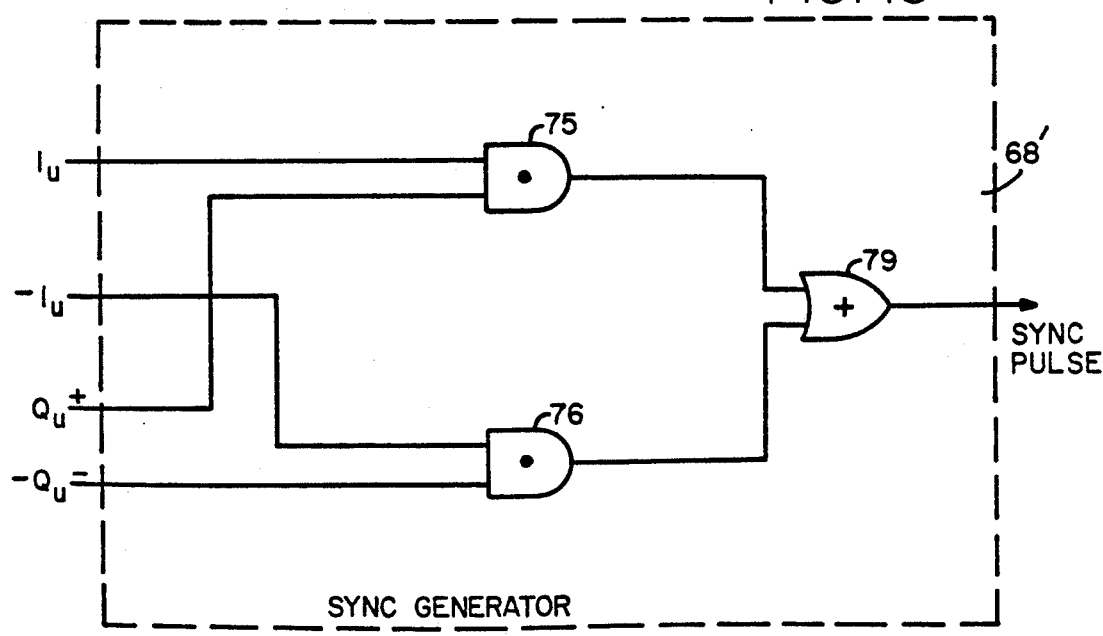
FIG. 10 is a logic diagram of a sync generator which forms a part of the phase ambiguity resolver shown in FIG. 9.

A simple example of the sync generator 68' is illustrated in FIG. 10. It is comprised of AND gates 75 and 86 and OR gate 79. Each pair of corresponding $I_u$ and $Q_u$ code words detected, inverted (complemented) or not produce a sync pulse. The decoding matrix of the first embodiment in FIG. 6 is thus reduced to being a sync generator 68' by omission of elements, leaving only those two AND gates and one OR gate of the decoding matrix 68 in FIG. 7 since there will be no need to even reverse $I_R$ and $Q_R$.

I claim:

1. In an offset quaternary phase-shift-keyed modulation system for digital communications, wherein unique inphase and quadrature words are separately modulated onto respective inphase and quadrature channels of a preamble before combining the channels to form a quadraphase modulated carrier for transmission of data bits of a quaternary phase-shift-keyed modulated message, and in which a receiver includes means for detecting said inphase and quadrature data channels of the received data from said quadraphase modulated carrier, an improvement in said receiver comprising means for tracking the phase of said modulated carrier and deriving a synchronization signal, said tracking means comprising a digital Costas loop and an integrated symbol synchronizer, said Costas loop comprising inphase and quadrature accumulators connected to receive data from said means of said receiver for detecting said inphase and quadrature data channels, respectively, said integrated symbol synchronizer being connected to receive the output of said inphase accumulator and produce said synchronizing signal, said integrated symbol synchronizer being connected to provide said synchronizing signal as a feedback to said inphase accumulator and with a delay of one half a bit symbol duration time Ts to a quadrature accumulator for correcting synchronization timing, thereby resolving four-phase ambiguity conditions using the inphase and quadrature channel reversal correcting property of said Costas loop with said integrated symbol synchronizer to correct errors associated with 90° and 270° carrier phase errors, and a phase ambiguity resolver connected to receive said inphase and quadrature data channels of said tracking means in which 90° and 270° carrier phase errors have been corrected, said phase ambiguity resolver including unique inphase word detector means and unique quadrature word detector means for separately determining when said unique inphase and quadrature words are received with bits 180° out of phase, means connected to said unique inphase word detector means and said unique quadrature word detector means for resolving phase ambiguity by separately inverting inphase and quadrature data bits thereby to so complement said bits as to correspond to bits of said unique words, whereby remaining phase ambiguity conditions associated with 0° and 180° carrier phase error are resolved, wherein each of said unique word detector means is comprised of means for separately correlating said unique inphase and quadrature words received with corresponding unique inphase and quadrature words transmitted, and means responsive to said means for correlating said unique inphase and quadrature words received for inverting data bits of a corresponding one of said inphase and quadrature data channels received thereafter, and means responsive to said means for separately correlating said inphase and said quadrature phase unique words for generating synchronizing pulses for demodulated data bits received thereafter.

2. A combination as defined in claim 1 wherein said inphase word detector means and said unique quadrature word detector means is comprised of parallel to serial converter means connected to receive data bits of said inphase and quadrature data channels for converting two streams of inphase and quadrature phase data bits from said inphase and quadrature receiver channels of said demodulator from said two streams of data bits into one stream of interlaced data bits of said unique inphase and quadrature phase words, a shift register means connected to receive said interlaced unique inphase and quadrature phase words in series, inphase unique word correlator means connected to every other stage of said shift register means starting with the second stage to receive data bits for correlating said unique inphase word to provide a plus output signal when said unique inphase word received correlates with said inphase unique word modulated at said transmitter, and a minus output signal when said unique inphase word received does not so correlate, decoding matrix means connected to an output signal at said minus output terminal of said inphase unique word correlation means for inverting inphase data bits received after said inphase unique word has been received in said register, quadrature phase unique word correlator means connected to every other stage of said shift register means starting with the first stage to receive data bits for correlating said unique quadrature word to provide an output signal at a plus output terminal when said unique inphase word received correlates with said quadrature phase unique word modulated at said transmitter, and an output signal at a minus output terminal if said unique quadrature word received does not so correlate, said decoding matrix means connected to said output signals at said minus output terminal of said quadrature phase unique word correlation means for inverting quadrature phase data bits received after said quadrature phase unique word has been received, and signal generator means for generating a sync pulse after said inphase and quadrature phase unique words have been received and correlated.

3. A combination as defined in claim 2 wherein said signal generator means is comprised of a first AND gate connected to said plus output inphase and quadrature unique word correlators for detecting when both said inphase and said quadrature phase unique word correlator means produce a signal at respective plus output terminals, a second AND gate connected to said minus output inphase and quadrature unique word correlators for detecting when both said inphase and quadrature phase unique word correlator means produce a signal at respective minus output terminals, and an OR gate connected to an output signal from said first and second AND gates for producing said sync pulse.

4. A combination as defined in claim 3 wherein said phase ambiguity resolver further includes said decoding matrix means connected to said inphase unique word correlator means and said quadrature phase unique word correlation means for producing a reverse control signal when data received in said inphase and quadrature channels have been reversed, and cross-coupling means connected to said reverse control signal for cross coupling the inphase and quadrature data bits received from said demodulator in response to output signals at respective plus and minus output terminals of said inphase word correlator means and said quadrature phase unique word correlator means comprising a third AND gate connected to said plus output terminal of said inphase unique word correlation means, a one-bit delay means coupling said plus output terminal of said quadrature phase unique word correlation means to said third AND gate, a fourth AND gate connected to said minus output terminal of said inphase unique word correlation means, a one-bit delay means coupling said minus output terminal of said quadrature phase unique word correlation means to said fourth AND gate, and a second OR gate connected to outputs of said third and fourth AND gates to provide said reverse control signal, and wherein said OR gate for producing said sync pulse has third and fourth input terminals connected of said third and fourth AND gates.

* * * * *